United States Patent
Honda et al.

(10) Patent No.: US 7,210,719 B2
(45) Date of Patent: May 1, 2007

(54) VEHICLE BUMPER BEAM MOUNTING STRUCTURE

(75) Inventors: Keiichi Honda, Wako (JP); Kazuo Omura, Wako (JP); Toshihiko Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 11/131,955

(22) Filed: May 18, 2005

(65) Prior Publication Data

US 2006/0186680 A1    Aug. 24, 2006

(30) Foreign Application Priority Data

Feb. 21, 2005    (JP) .............................. 2005-044254

(51) Int. Cl.
  *B60R 19/34* (2006.01)
(52) U.S. Cl. .................. 293/155; 293/133; 293/102
(58) Field of Classification Search ................ 293/133, 293/155, 102
  See application file for complete search history.

(56) References Cited

U.S. PATENT DOCUMENTS

| | | | |
|---|---|---|---|
| 5,732,801 A * | 3/1998 | Gertz | 188/377 |
| 6,481,690 B2 * | 11/2002 | Kariatsumari et al. | 293/155 |
| 6,712,411 B2 * | 3/2004 | Gotanda et al. | 293/155 |
| 6,886,873 B2 * | 5/2005 | Weykamp et al. | 293/133 |
| 6,988,753 B1 * | 1/2006 | Omura et al. | 293/13 |
| 2005/0104393 A1 * | 5/2005 | Haneda et al. | 293/133 |

FOREIGN PATENT DOCUMENTS

JP    07-265988    10/1995

\* cited by examiner

*Primary Examiner*—Dennis H Pedder
*Assistant Examiner*—Melissa A Black
(74) *Attorney, Agent, or Firm*—Rankin, Hill, Porter & Clark LLP (57) ABSTRACT

A bumper beam mounting structure for absorbing an impact at a bumper beam and mounting members thereof in a vehicle minor collision is provided. The mounting structure has the mounting members attached to curved portions of right and left curved ends of the bumper beam. The mounting members are attachable to vehicle body members. The mounting members are in a right triangular shape in a plan view. A sloping portion corresponding to the hypotenuse is formed with a depressed portion for absorbing an impact.

7 Claims, 8 Drawing Sheets

VEHICLE BUMPER BEAM MOUNTING STRUCTURE

FIELD OF THE INVENTION

The present invention relates to a vehicle bumper beam mounting structure which allows a bumper beam itself or mounting portions of the bumper beam to absorb a small impact applied to a vehicle body.

BACKGROUND OF THE INVENTION

Bumper beams configured to absorb an impact by the bumper beams themselves or mounting portions of the bumper beams in a minor collision (when a small impact is applied to a vehicle body) have been in practical use. This kind of bumper beam only needs to be set small in rigidity at the bumper beam or at mounting portions of the bumper beam for practical use.

Japanese Patent Laid-Open Publication No. HEI-7-265988 discloses a bumper beam mounting structure in which mounting members are attached to a bumper beam, and the mounting members are attached to a vehicle body. This bumper beam mounting structure will be described with reference to FIGS. 10 and 11.

Figure 10:
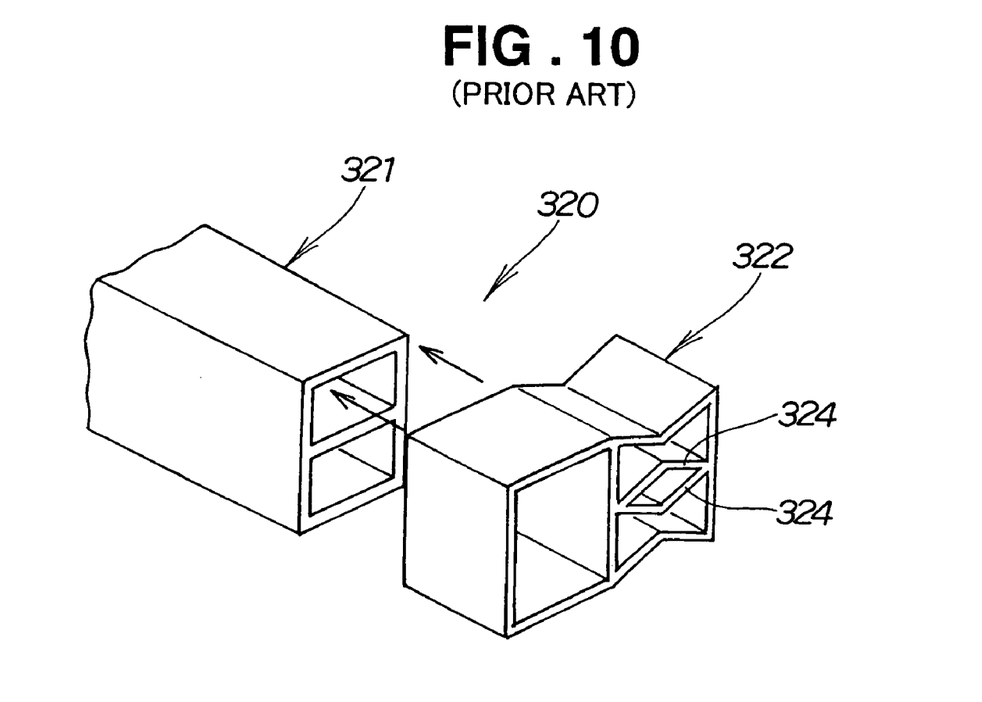
FIG. 10 is an exploded perspective view of a conventional vehicle bumper beam mounting structure, illustrating the basic principles.

A conventional bumper beam mounting structure 320 shown in FIG. 10 consists of a bumper beam 321 and mounting members 322, 322 fitted and fixed to opposite ends thereof for supporting the bumper beam 321 on a vehicle body. The mounting members 322 are made from extruded materials and each have a plurality of ribs 324. The bumper beam 321 is made from an extruded material.

Figure 11:
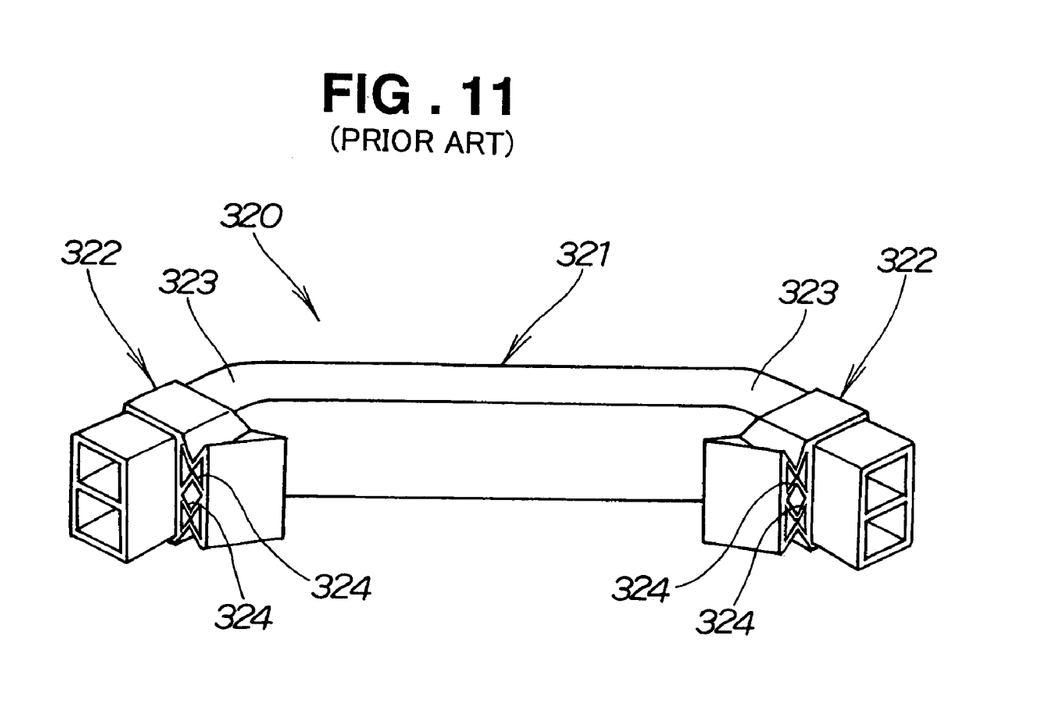
FIG. 11 is a perspective view of the conventional vehicle bumper beam mounting structure, illustrating the basic principles.

As shown in FIG. 11, portions where the mounting members 322, 322 are fixed to the bumper beam 321 are bent to form curved portions 323, 323, and then the mounting members 322, 322 are crushed to form the mounting members 322, 322 in shapes attachable to the vehicle body.

It is preferable to make considerations for a bumper beam or mounting members thereof to absorb the impact of a minor collision when the front or rear of a vehicle traveling at low speed collides with an obstacle (generally called a "minor collision"), so as to prevent front members or rear members located inwardly of the bumper beam from being affected.

In the conventional bumper beam mounting structure 320, however, the mounting members 322, 322 have high rigidity because they are each formed with the ribs 324, 324, and the ribs 324, 324 are crushed. It cannot be expected to absorb an impact by the mounting members 322, 322 in a minor collision.

Also, in the conventional bumper beam mounting structure 320, the bumper beam 321 is not intentionally formed with any portions which promote deformation for impact absorption. Therefore, it cannot also be expected to positively absorb an impact by the bumper beam 321 in a minor collision.

There is thus a desire for a vehicle bumper beam mounting structure which allows a bumper beam or mounting members to absorb the impact of a minor collision in which the front or rear of a vehicle collides with an obstacle at low speed.

SUMMARY OF THE INVENTION

According to the present invention, there is provided a vehicle bumper beam mounting structure, which comprises: a bumper beam made from an extrusion material and having curved portions at right and left ends thereof, respectively; and right and left mounting members attached to the right and left curved portions and being attachable to vehicle body members which extend longitudinally of a vehicle body; the mounting members each including; a perpendicular portion located inboard and extending longitudinally of the vehicle body; and a sloping portion abutting on the curved portion and sloping from a distal edge of the perpendicular portion located forward or rearward of the vehicle body in an outward and rearward or forward direction of the vehicle body; the sloping portion having a depressed portion oriented rearward or forward of the vehicle body.

Accordingly, in a vehicle minor collision, the mounting members and/or the bumper beam deform, absorbing the impact, and thus preventing deformation of the vehicle body members and the like.

The curved portions each preferably have a weak portion for allowing deformation of the bumper beam. The curved portions thus absorb the impact of a minor collision, preventing deformation of the vehicle body members and the like.

The mounting members each preferably have a relief portion formed in the depressed portion and comprising at least one hole. Thus, the depressed portion does not deform irregularly and affect the vehicle body members.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
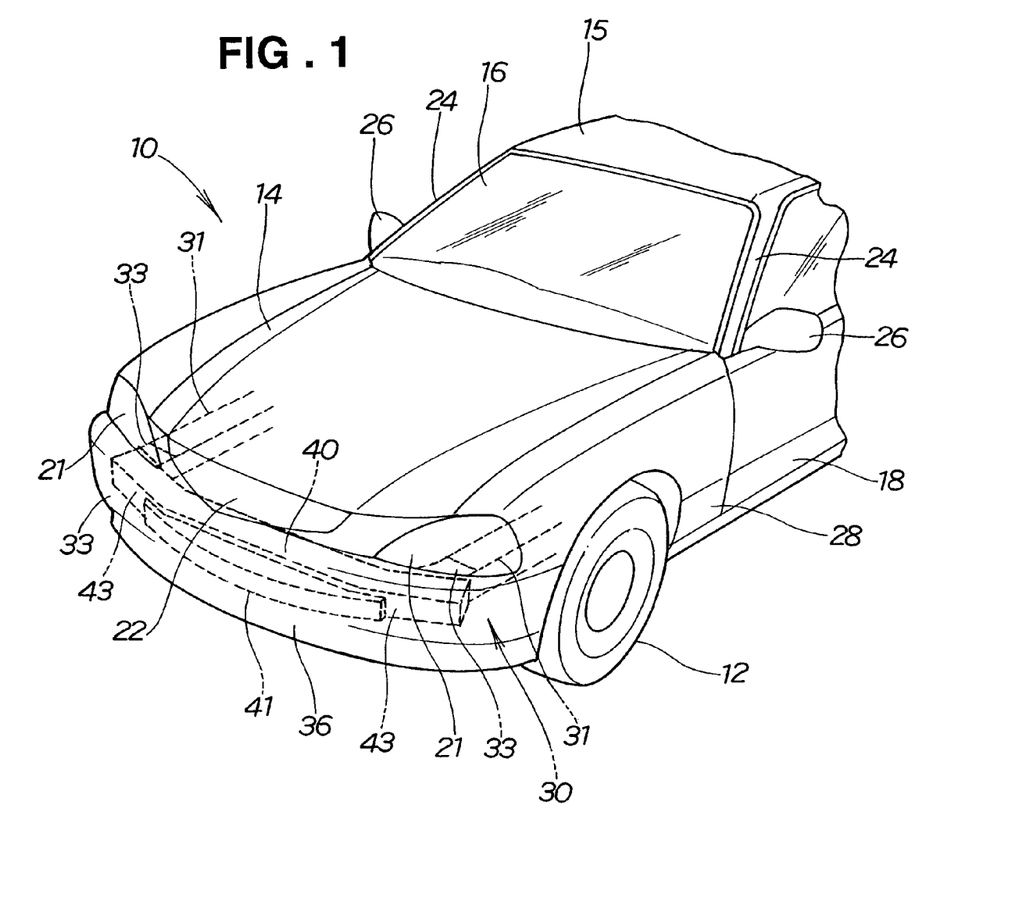
FIG. 1 is a perspective view of a vehicle employing a bumper beam mounting structure according to the present invention.

FIG. 1 shows a vehicle employing a bumper beam mounting structure according to the present invention. In the figure, reference numeral 10 denotes a vehicle; 12, a front wheel; 14, a bonnet; 15, a roof; 16, a windshield; 18, a front door; 21, a headlight; 22, a front grille; 24, a front pillar; 26, a door mirror; 28, a front fender; 31, a front side member (vehicle body member); 36, a bumper face (front bumper face); 40, a bumper beam; and 41, an impact absorber.

A bumper beam mounting structure 30 includes the bumper beam 40 formed from an aluminum extrusion. The bumper beam 40 has opposite end portions curved rearward of the vehicle body, forming right and left curved portions 43, 43. Right and left mounting members 33, 33 are attached to the right and left curved portions 43, 43, respectively. The mounting members 33, 33 are attached to the front side members 31, 31, so that an impact applied from the bumper beam 40 to the vehicle body is substantially absorbed by the mounting members 33, 33 and the curved portions 43, 43 of the bumper beam 40.

Figure 2:
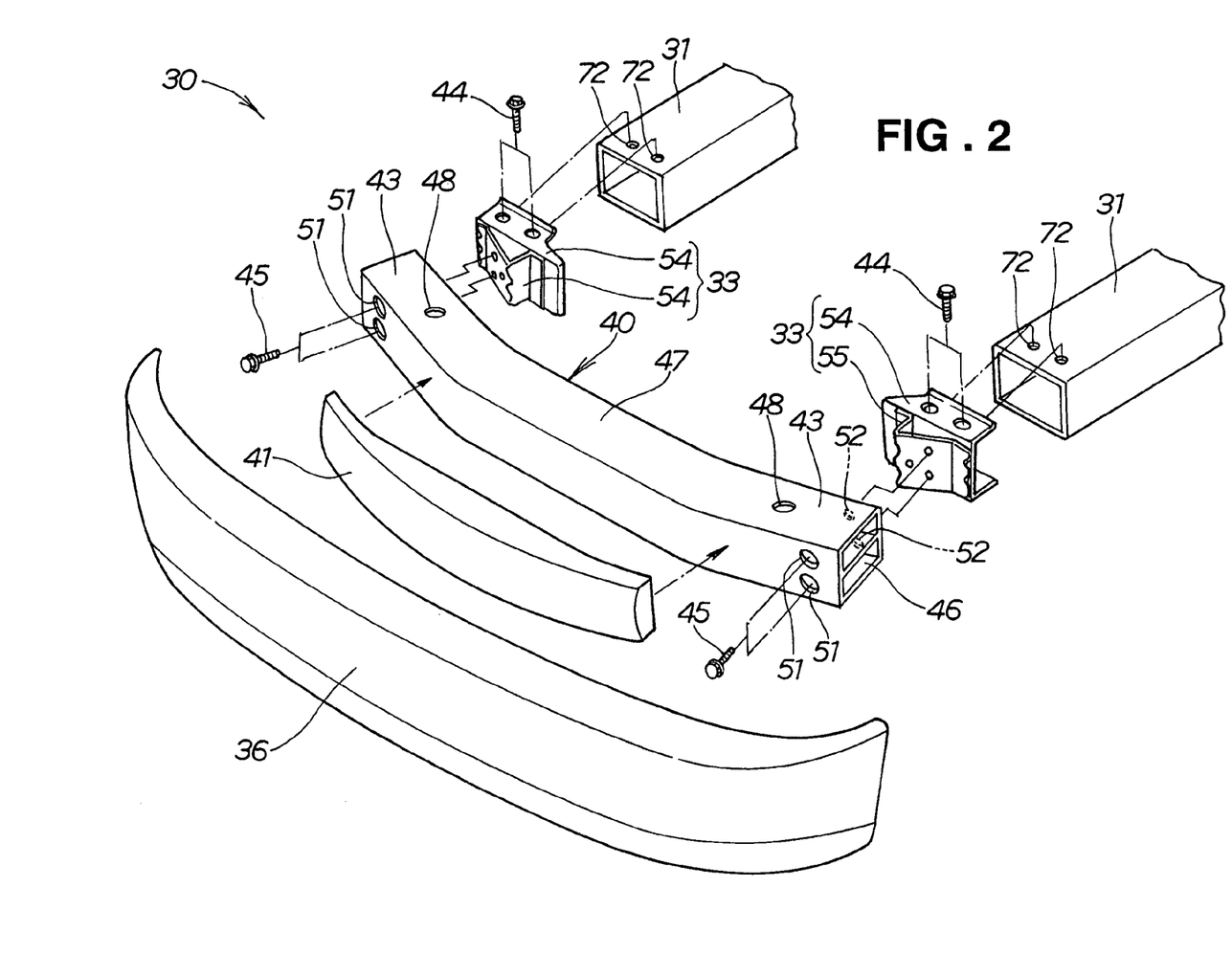
FIG. 2 is an exploded perspective view of the bumper beam mounting structure according to the present invention.

The bumper beam mounting structure 30 shown in FIG. 2 includes the mounting members 33, 33 attached to the right and left front side members 31, 31, respectively, the bumper beam 40 supported on the front side members 31, 31 via the mounting members 33, 33, the impact absorber 41 attached to the front face of the bumper beam 40, and the bumper face 36 covering the impact absorber 41 and the bumper beam 40. The right and left mounting members 33, 33 are fixed to the right and left front side members 31, 31 by bolts 44, 44. The bumper beam 40 is attached to the mounting members 33, 33 by a plurality of bolts 45.

Next, with reference to FIGS. 3 to 7, components of the bumper beam mounting structure 30 according to the present invention will be described.

The bumper beam 40 is a member of rectangular cross section formed from an aluminum extrusion and provided with a horizontal rib 46. The bumper beam 40 includes a bumper beam linear portion 47 covering a front central face of the vehicle body, the curved portions 43, 43 of the right and left end portions curved from the bumper beam linear portion 47, and holes (weak portions) 48 formed in top and bottom surfaces of the curved portions 43, 43. The curved portions 43, 43 are each formed with a plurality of bolt insertion holes 51 through which the bolts 45 are inserted toward the mounting members 33, 33. A plurality of bolt insertion holes 52 (see FIG. 2) through which the bolts 45 are inserted into the mounting members 33, 33 are formed in the curved portions 43, 43 at locations opposite to the bolt insertion holes 51.

Figure 6:
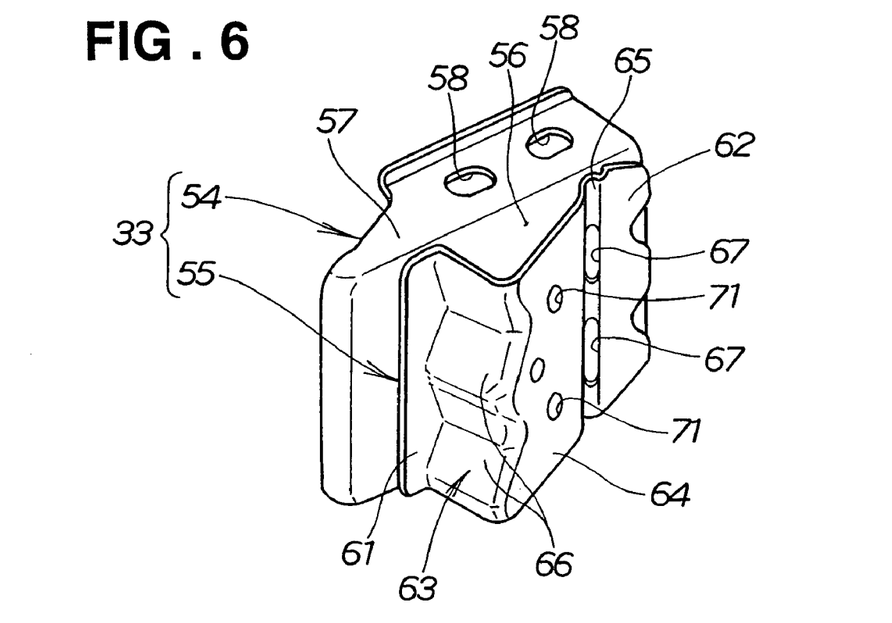
FIG. 6 is a perspective view of a mounting member shown in FIG. 3.

As shown in FIG. 6, each mounting member 33 includes a holder 54 to be attached to the front side member 31 (see FIG. 2), and an impact-absorbing portion 55 for supporting the bumper beam 40 and absorbing an impact. The impact-absorbing portion (impact-absorbing frame) 55 is integrally attached to the holder 54.

The holder 54 includes an attachment surface 56 to which the impact-absorbing portion 55 is attached, and upper and lower flanges 57, 57 (see FIG. 7) at the top and bottom of the attachment surface 56, bent toward the front side member 31 (see FIG. 2). The upper and lower flanges 57, 57 each include a plurality of mounting holes 58 to be mounted to the front side members 31, 31.

The impact-absorbing portion (impact-absorbing frame) 55 is formed by bending a sheet metal, and includes an inner attached portion 61 formed inboard to be attached to the attachment surface 56 of the holder 54, an outer attached portion 62 formed outboard to be attached to the attachment surface 56 of the holder 54, a perpendicular portion 63 as a short side raised at a substantially right angle from the inner attached portion 61, a sloping portion (hypotenuse) 64 extending from the distal edge of the perpendicular portion 63 to the outer attached portion 62 at a slant, and a depressed portion 65 formed at the outboard side of the sloping portion 64 and formed in a U shape toward the holder 54.

The perpendicular portion 63 includes a corrugated surface 66 for increasing rigidity. The depressed portion 65 includes relief portions (holes) 67, 67 for allowing deformation. The sloping portion 64 includes a plurality of insertion holes (attachment portions) 71, 71 through which the bolts 45, 45 (see FIG. 2) are inserted.

In other words, each mounting member 33 has a substantially right-triangular shape in a plan view. The hypotenuse of the substantially right triangle is constituted by the sloping portion 64. The depressed portion 65 oriented inwardly of the right triangle is formed at the outboard side of the sloping portion 64. The sloping portion 64 abuts on the curved portion 43 (see FIG. 4). Of the remaining two sides, a long side and a short side, of the substantially right triangle, the long side is constituted by the attachment surface 56 of the holder 54. The attachment surface 56 is oriented toward the front side member (see FIG. 2). The short side is constituted by the perpendicular portion 63. The perpendicular portion 63 is oriented inboard.

Figure 7:
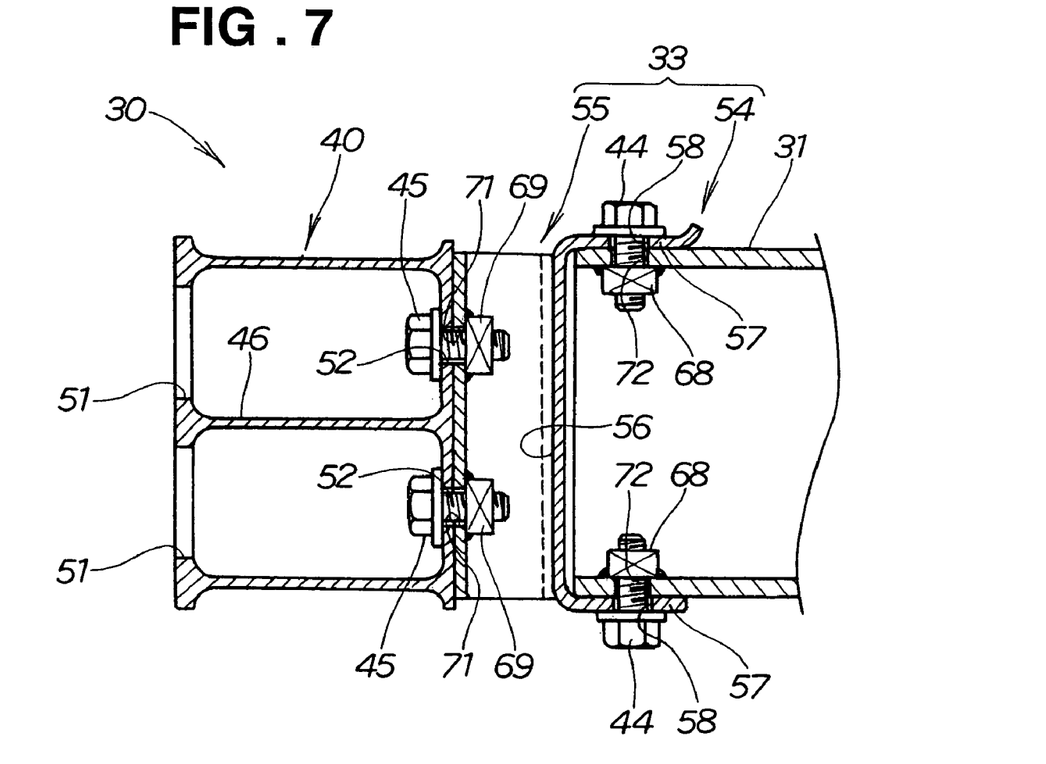
FIG. 7 is a cross-sectional view along line 7—7 of FIG. 3.

As shown in FIG. 7, the holder 54 of the mounting member 33 is fixed at the upper and lower flanges 57, 57 to the front side member 31 by the bolts 44 and nuts 68, 68. The nuts 68, 68 are welded to the front side member 31. The impact-absorbing portion 55 of the mounting member 33 is fixed to the bumper beam 40 by the bolts 45, 45 and nuts 69, 69. The nuts 69, 69 are welded to the impact-absorbing portion 55.

Reference numerals 72, 72 denote insertion holes formed in the front side member 31, through which the bolts 44, 44 are inserted.

As described above, in the bumper beam mounting structure 30 of the present invention, the mounting members 33, 33 attached to the curved portions 43, 43 at the opposite ends of the bumper beam 40 are formed in a substantially right-triangular shape in a plan view. The sloping portion (hypotenuse) 64 of the substantially right triangle is formed with the depressed portion 65 oriented inward of the right triangle. The hypotenuse constituted by the sloping portion 64 abuts on the curved portion 43. The long side (attachment surface) 56 of the remaining two sides of the right triangle is opposed to the front side member (vehicle body member) 31, and the short side (perpendicular portion) 63 is oriented inboard. When the front or rear of the vehicle 10 (see FIG. 1) collides with an obstacle at low speed, that is, in a minor collision, the mounting members 33 absorb the impact, preventing deformation of inside members of the vehicle body such as the front side members 31, 31.

Also, weak portions for allowing deformation of the bumper beam 40 are formed at the curved portions 43 near the mounting members 33. The weak portions are constituted by the holes 48, 48 formed in the curved portions 43 to make areas around them weak. In a vehicle minor collision, the curved portions 43 of the bumper beam 40 can thus absorb the impact, preventing deformation of inside members of the vehicle body.

Absorption of an impact by a bumper beam or mounting members in a vehicle minor collision as described above is preferable because it prevents the collision from further affecting the inside of the vehicle body.

Figure 8A:
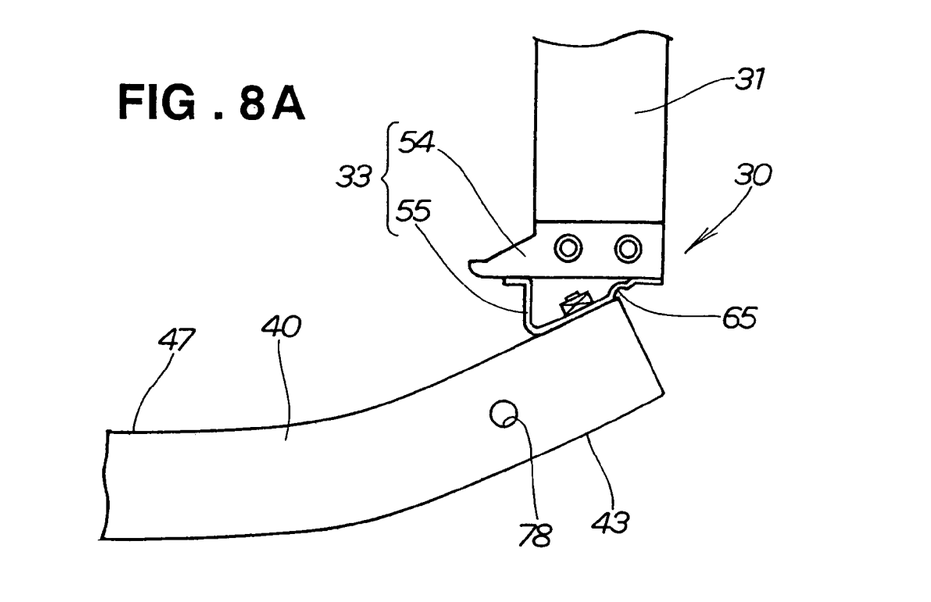
FIGS. 8A and 8B are diagrams illustrating an initial impact-absorbing state of the bumper beam mounting structure in a vehicle minor collision.
Figure 8B:
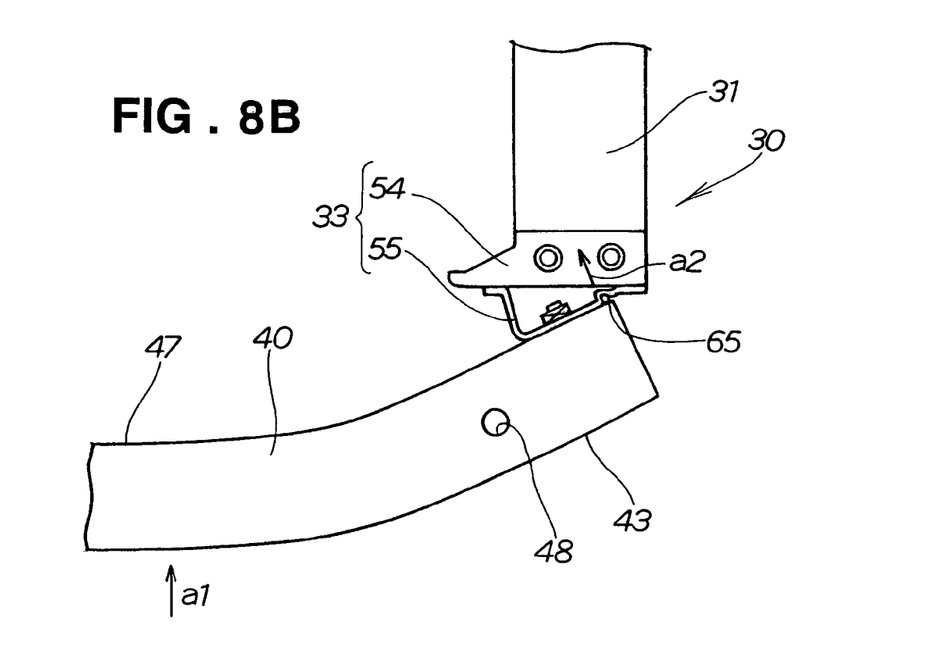

FIGS. 8A and 8B show an initial impact-absorbing state of the bumper beam mounting structure 30 in a vehicle minor collision.

FIG. 8A shows the bumper beam mounting structure 30 in a state before a vehicle collision.

As shown in FIG. 8B, when an impact acts on the bumper beam 40 as shown by arrow a1, first, the depressed portion 65 formed in the impact-absorbing portion 55 of the mounting member 33 deforms as shown by arrow a2.

Figure 9A:
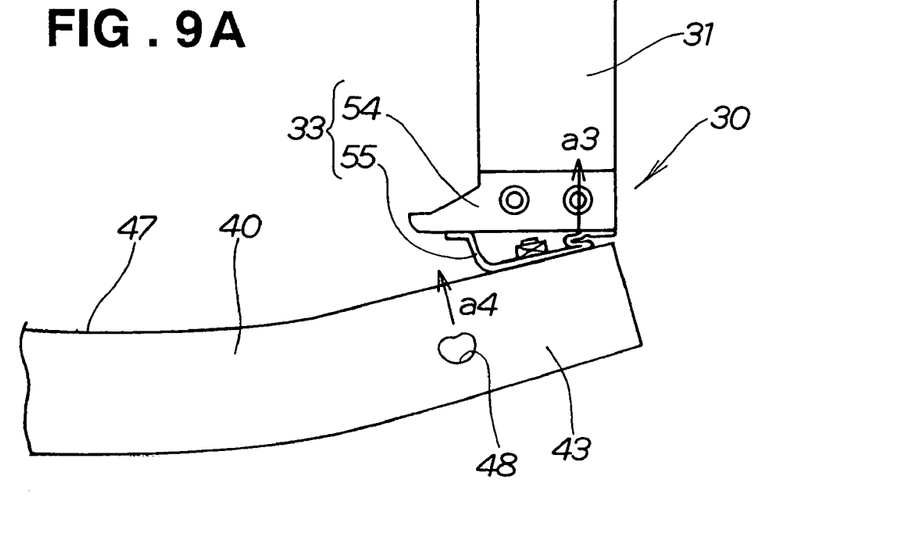
FIGS. 9A and 9B are diagrams illustrating a final impact-absorbing state of the bumper beam mounting structure in a vehicle minor collision.
Figure 9B:
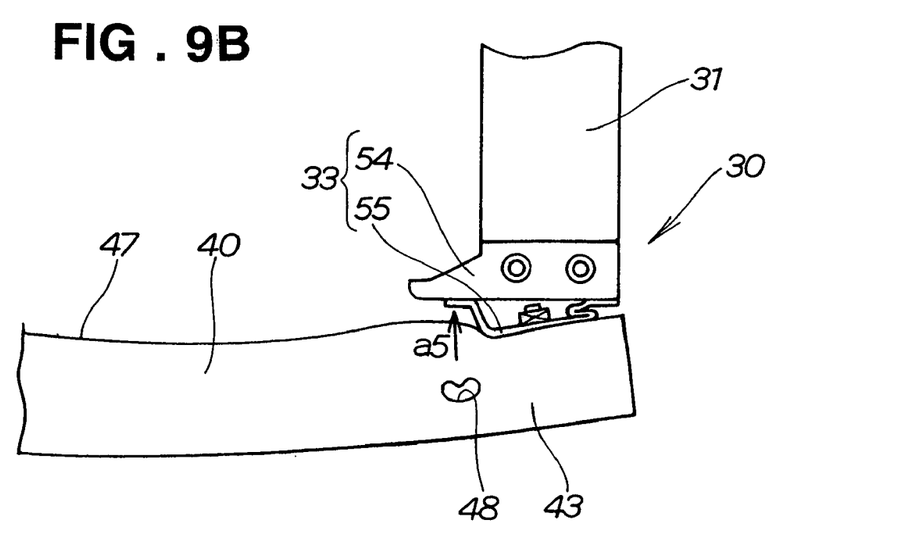

FIGS. 9A and 9B show a final impact-absorbing state of the bumper beam mounting structure 30 in a minor collision.

Referring to FIG. 9A, the depressed portion 65 in the impact-absorbing portion 55 deforms as it collapses by an impact force shown by arrow a3. Further, the weak portions around the holes 48 formed in the bumper beam 40 start to deform as shown by arrow a4, and also the holes 48 deform in shape.

Referring to FIG. 9B, the weak portions around the holes 48 formed in the bumper beam 40 further deform as shown by arrow a5, absorbing the impact. As a result, damage to vehicle body members such as the front side members 31 can be prevented.

Figure 3:
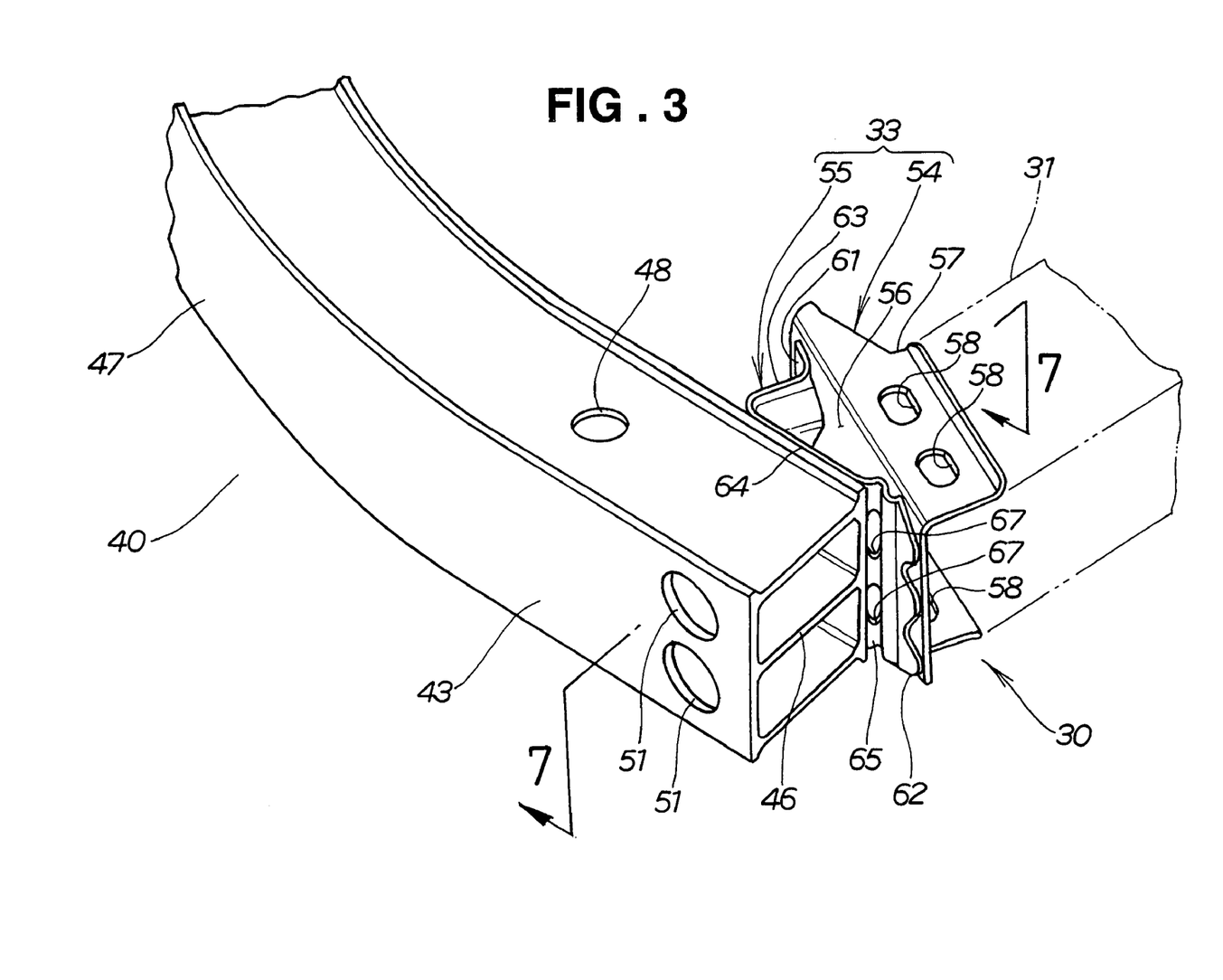
FIG. 3 is a perspective view of the bumper beam mounting structure shown in FIG. 2 assembled.
Figure 4:
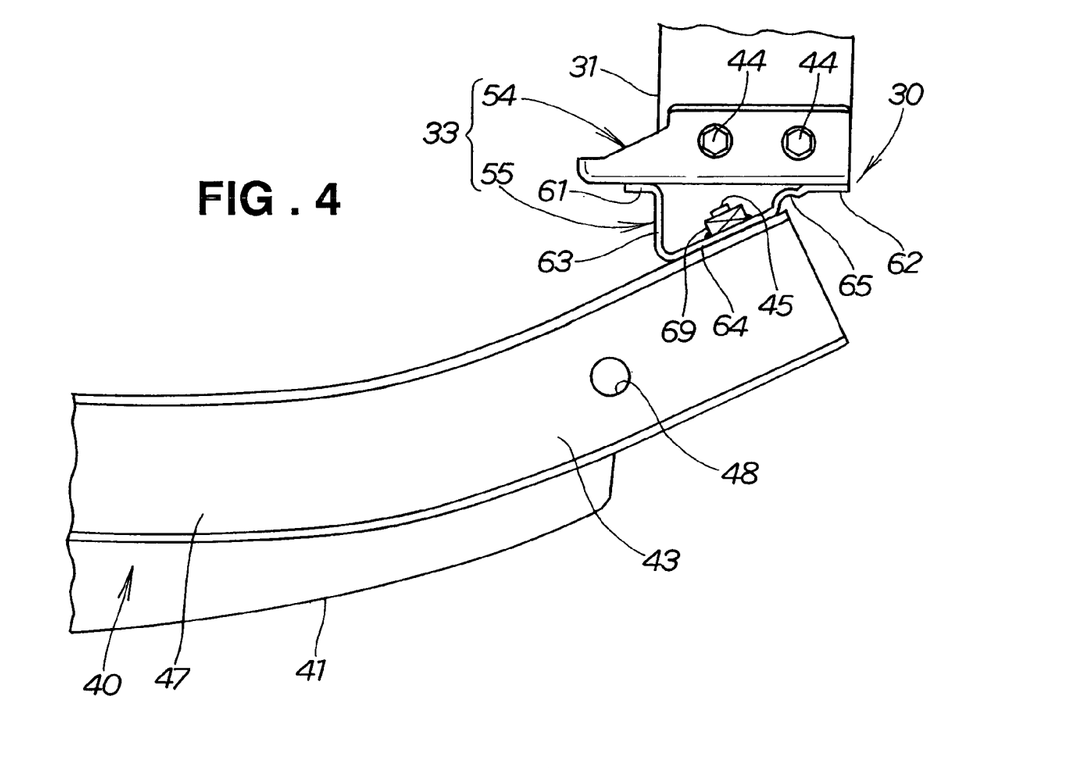
FIG. 4 is a plan view of the bumper beam mounting structure shown in FIG. 3.

As shown in FIG. 3, the bumper beam 40 is formed with the curved portions 43, and the bumper beam 40 is also formed with the holes 48 (near the mounting members 33), whereby the weak portions for allowing deformation of the bumper beam 40 are formed. Also, as shown in FIG. 6, the perpendicular portion 63 of each mounting member 33 is formed with the corrugated surface 66 for increasing rigidity, and the mounting member 33 is formed with the relief portions 67, 67 for allowing deformation (at the outboard side of the sloping portion 64). Accordingly, the bumper beam mounting structure 30 can promote smooth deformation of the bumper beam 40 and the mounting members 33 as shown in FIGS. 8A to 9B. In a minor collision in which the vehicle collides with an obstacle at low speed, the bumper beam mounting structure 30 (especially the bumper beam 40 and the mounting members 33) can promote absorption of the impact. As a result, as described above, damage to vehicle body members such as the front side members 31 can be prevented.

The bumper beam mounting structure 30 illustrated in this embodiment has been described with an example in which each mounting member 33 is constituted by two parts, the holder 54 and the impact-absorbing portion 55, as shown in FIG. 6. However, the present invention is not limited thereto, and each mounting member 33 may be constituted by one part.

Figure 5:
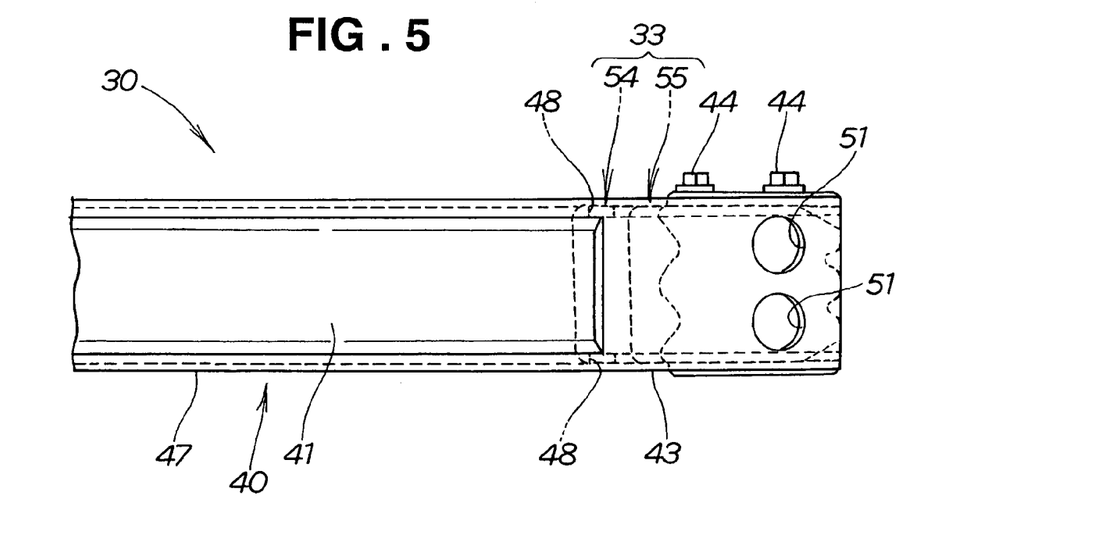
FIG. 5 is a front view of the bumper beam mounting structure shown in FIG. 4.

This embodiment has been described with an example of forming the holes 48 in the top and bottom surfaces of the bumper beam 40 to provide the weak portions 48 as shown in FIG. 5, which is not limiting. It may alternatively be possible to provide a weak portion in one of the top and bottom surfaces of the bumper beam 40. Also, the weak portion is not limited to a hole, and may be a slit or a notch.

This embodiment has been described with an example of forming the bumper beam 40 from an aluminum extrusion as shown in FIG. 2, which is not limiting. It may alternatively be an aluminum alloy or a magnesium alloy.

Also, this embodiment has been described with a front bumper beam to be mounted to the front of the vehicle 10 (see FIG. 1) as an example as shown in FIG. 2, which is not limiting. The present invention can also be applied to a rear bumper beam to be mounted to the rear of a vehicle.

Obviously, various minor changes and modifications of the present invention are possible in the light of the above teaching. It is therefore to be understood that within the scope of the appended claims the invention may be practiced otherwise than as specifically described.

What is claimed is:

1. A vehicle bumper beam mounting structure comprising:
   a bumper beam made from an extrusion material and having curved portions at right and left ends thereof, respectively, said bumper beam curved portions having weak portions; and
   right and left mounting members attached to the right and left curved portions and being attachable to vehicle body members which extend longitudinally of a vehicle body,
   the mounting members each including:
      a perpendicular portion located inboard and extending longitudinally of the vehicle body, said perpendicular portion having a corrugated surface for increasing rigidity of the perpendicular portion; and
      a sloping portion abutting on the curved portion and sloping from a distal edge of the perpendicular portion located forward or rearward of the vehicle body in an outward and rearward or forward direction of the vehicle body, the sloping portion having a depressed portion oriented rearward or forward of the vehicle body, said depressed portion including relief portions for allowing deformation of the mounting member; and,
   wherein the weak portions of the bumper beam are formed in the bumper beam near the perpendicular portion of the mounting member so as to allow deformation of the bumper beam.

2. The bumper beam mounting structure as set forth in claim 1, wherein one of the relief portions comprising at least one hole.

3. The bumper beam mounting structure as set forth in claim 1, wherein the bumper beam includes a linear portion extending between the curved portions, and wherein weak portions are holes formed in the bumper beam curved portions near the linear portion.

4. The bumper beam mounting structure as set forth in claim 1, wherein the mounting members, in plan view, are generally triangular in shape.

5. The bumper beam mounting structure as set forth in claim 2, wherein the bumper beam includes a linear portion extending between the curved portions, and wherein weak portions are holes formed in the bumper beam curved portions near the linear portion.

6. The bumper beam mounting structure as set forth in claim 2, wherein the mounting members, in plan view, are generally triangular in shape.

7. The bumper beam mounting structure as set forth in claim 1, wherein each of the mounting members further include a holder, an inner attached portion, and an outer attached portion, said holder being secured to the associated vehicle body member and defining an attachment surface facing toward said bumper beam, said inner attached portion being attached to said holder attachment surface and connected to said perpendicular portion, said perpendicular portion extending generally perpendicular to said inner attached portion, said outer attached portion being attached to said holder attachment surface and being connected to said sloping portion.

* * * * *

UNITED STATES PATENT AND TRADEMARK OFFICE
CERTIFICATE OF CORRECTION

| | | |
|---|---|---|
| PATENT NO. | : 7,210,719 B2 | Page 1 of 1 |
| APPLICATION NO. | : 11/131955 | |
| DATED | : May 1, 2007 | |
| INVENTOR(S) | : Honda et al. | |

It is certified that error appears in the above-identified patent and that said Letters Patent is hereby corrected as shown below:

Column 6, Line 32, (Claim 2, Line 2), delete "comprising" and insert --comprises--.

Signed and Sealed this

Twelfth Day of June, 2007

JON W. DUDAS
*Director of the United States Patent and Trademark Office*